United States Patent
Liu et al.

(10) Patent No.: US 10,966,069 B1
(45) Date of Patent: Mar. 30, 2021

(54) SYSTEMS AND METHODS FOR HD MAP GENERATION USING AN EDGE SERVER NETWORK

(71) Applicant: TOYOTA MOTOR ENGINEERING & MANUFACTURING NORTH AMERICA, INC., Plano, TX (US)

(72) Inventors: Yin-Chen Liu, Mountain View, CA (US); BaekGyu Kim, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/699,891

(22) Filed: Dec. 2, 2019

(51) Int. Cl.
| | |
|---|---|
| *H04W 4/38* | (2018.01) |
| *H04W 4/44* | (2018.01) |
| *H04W 4/029* | (2018.01) |
| *H04L 29/08* | (2006.01) |
| *H04W 4/02* | (2018.01) |

(52) U.S. Cl.
CPC ........... *H04W 4/38* (2018.02); *H04L 67/1021* (2013.01); *H04W 4/027* (2013.01); *H04W 4/029* (2018.02); *H04W 4/44* (2018.02)

(58) Field of Classification Search
CPC ......... G05D 1/0285; G05D 2201/0213; G06N 3/0454; G06N 3/08; G06N 20/00; G07C 5/008; G08G 1/0112; G08G 1/0145; H04L 67/1021; H04W 4/027; H04W 4/029; H04W 4/38; H04W 4/44
See application file for complete search history.

(56) References Cited

U.S. PATENT DOCUMENTS

| | | |
|---|---|---|
| 6,859,927 B2 | 2/2005 | Moody et al. |
| 8,504,400 B2 | 8/2013 | Purcell et al. |

(Continued)

FOREIGN PATENT DOCUMENTS

| | | |
|---|---|---|
| CN | 108931971 A | 12/2018 |
| WO | 2019053524 A1 | 3/2019 |
| WO | 2019053695 A1 | 3/2019 |

OTHER PUBLICATIONS

J. Jiao, "Machine Learning Assisted High-Definition Map Creation," 2018 IEEE 42nd Annual Computer Software and Applications Conference (COMPSAC), Tokyo, 2018, pp. 367-373. doi: 10.1109/COMPSAC.2018.00058.

*Primary Examiner* — Ernest G Tacsik
(74) *Attorney, Agent, or Firm* — Dinsmore & Shohl LLP (57) ABSTRACT

Systems and methods are disclosed. A controller includes one or more processors; and one or more non-transitory memory modules storing machine-readable instructions that, when executed, cause the one or more processors to obtain environment data associated with a vehicle; obtain trajectory data associated with the vehicle; and identify one or more edge servers associated with the trajectory data. The machine-readable instructions, when executed, cause the one or more processors to obtain edge server state information of the one or more edge servers; select a first set of the environment data to transmit to a first edge server of the one or more edge servers based on the edge server state information of the one or more edge servers; and generate an instruction signal causing the vehicle to transmit the first set of the environment data to the first edge server of the one or more edge servers.

16 Claims, 7 Drawing Sheets

(56) References Cited

U.S. PATENT DOCUMENTS

| | | |
|---|---|---|
| 8,505,011 B2 | 8/2013 | Isaka |
| 10,296,828 B2 | 5/2019 | Viswanathan |
| 2017/0069209 A1* | 3/2017 | Beaurepaire ..... G08G 1/096805 |
| 2017/0070616 A1* | 3/2017 | DiMeo ................ G01C 21/3415 |
| 2018/0063261 A1* | 3/2018 | Moghe .................... H04L 67/12 |
| 2018/0276485 A1* | 9/2018 | Heck .................... G06Q 10/047 |
| 2019/0012625 A1 | 1/2019 | Lawrenson et al. |
| 2019/0228262 A1 | 7/2019 | Gonzalez et al. |
| 2019/0311616 A1* | 10/2019 | Jin .................... G08G 1/096783 |
| 2020/0074320 A1* | 3/2020 | Seshadri ................ G08G 1/202 |

\* cited by examiner

SYSTEMS AND METHODS FOR HD MAP GENERATION USING AN EDGE SERVER NETWORK

TECHNICAL FIELD

The present specification generally relates to systems and methods for high-definition (HD) map generation using an edge server network and, more particularly, systems and methods for optimizing an HD map generation process using the edge server network.

BACKGROUND

High-definition (HD) maps are digital maps that include information and semantics of a roadway system and a surrounding environment. Vehicle systems receive information from HD maps to execute various functions including, but not limited to, localization functions, perception functions, prediction functions, motion planning functions, vehicle control functions, and/or the like. In order to receive the HD maps to execute various functions, the vehicle systems may communicate with one or more edge servers to obtain the HD maps. The one or more edge servers provide computation and storage capability to the proximity of demand in order to reduce a latency experienced by the vehicle system and an operator of the corresponding vehicle.

In order to generate HD maps, one or more vehicles of the roadway system may obtain raw sensor data indicating various features of the roadway system and the surrounding environment and transmit the raw sensor data to one or more edge servers. One or more computing devices in communication and/or of the one or more edge servers may subsequently generate the HD maps based on the received raw sensor data. However, generating the HD maps based on the raw sensor data may require significant amounts of computing resources. Accordingly, a need exists for providing an optimized schedule for transmitting and processing the raw sensor data utilized to generate the HD maps.

SUMMARY

In one embodiment, a controller is disclosed and includes one or more processors and one or more non-transitory memory modules storing machine-readable instructions that, when executed, cause the one or more processors to obtain environment data associated with a vehicle; obtain trajectory data associated with the vehicle; and identify one or more edge servers associated with the trajectory data. The machine-readable instructions, when executed, cause the one or more processors to obtain edge server state information of the one or more edge servers, wherein the edge server state information includes information indicating a computing capacity of the one or more edge servers. The machine-readable instructions, when executed, cause the one or more processors to select a first set of the environment data to transmit to a first edge server of the one or more edge servers based on the edge server state information of the one or more edge servers. The machine-readable instructions, when executed, cause the one or more processors to generate an instruction signal causing the vehicle to transmit the first set of the environment data to the first edge server of the one or more edge servers.

In another embodiment, a method is disclosed and includes obtaining, by one or more processors, environment data associated with a vehicle; obtaining, by the one or more processors, trajectory data associated with the vehicle; and identifying, by the one or more processors, one or more edge servers associated with the trajectory data. The method includes obtaining, by the one or more processors, edge server state information of the one or more edge servers, wherein the edge server state information includes information indicating a computing capacity of the one or more edge servers. The method includes selecting, by the one or more processors, a first set of the environment data to transmit to a first edge server of the one or more edge servers based on the edge server state information of the one or more edge servers. The method includes generating, by the one or more processors, an instruction signal that causes the vehicle to transmit the first set of the environment data to the first edge server of the one or more edge servers.

In yet another embodiment, a system is disclosed and includes a vehicle, a plurality of edge servers, and a service allocation computing device. The service allocation computing device includes one or more processors and one or more non-transitory memory modules communicatively coupled to the one or more processors. The one or more non-transitory memory modules store machine-readable instructions that, when executed, cause the one or more processors to obtain environment data associated with the vehicle; obtain trajectory data associated with the vehicle; and identify one or more edge servers of the plurality of edge servers, the one or more edge servers associated with the trajectory data. The one or more non-transitory memory modules store machine-readable instructions that, when executed, cause the one or more processors to obtain edge server state information of the one or more edge servers, wherein the edge server state information includes information indicating a computing capacity of the one or more edge servers. The one or more non-transitory memory modules store machine-readable instructions that, when executed, cause the one or more processors to select a first set of the environment data to transmit to a first edge server of the one or more edge servers based on the edge server state information of the one or more edge servers; and generate an instruction signal causing the vehicle to transmit the first set of the environment data to the first edge server of the one or more edge servers.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are generally related to systems for optimizing an HD map generation process using an edge server network. As described herein, the HD map generation process may be optimized based on sensor data obtained by a vehicle, a computing capacity of one or more edge servers of an edge server network, and a computing resource price associated with the one or more edge servers of an edge server network. Accordingly, the one or more edge servers may generate the HD map with minimized latency and improved efficiency, as described herein in further detail.

Figure 1A:
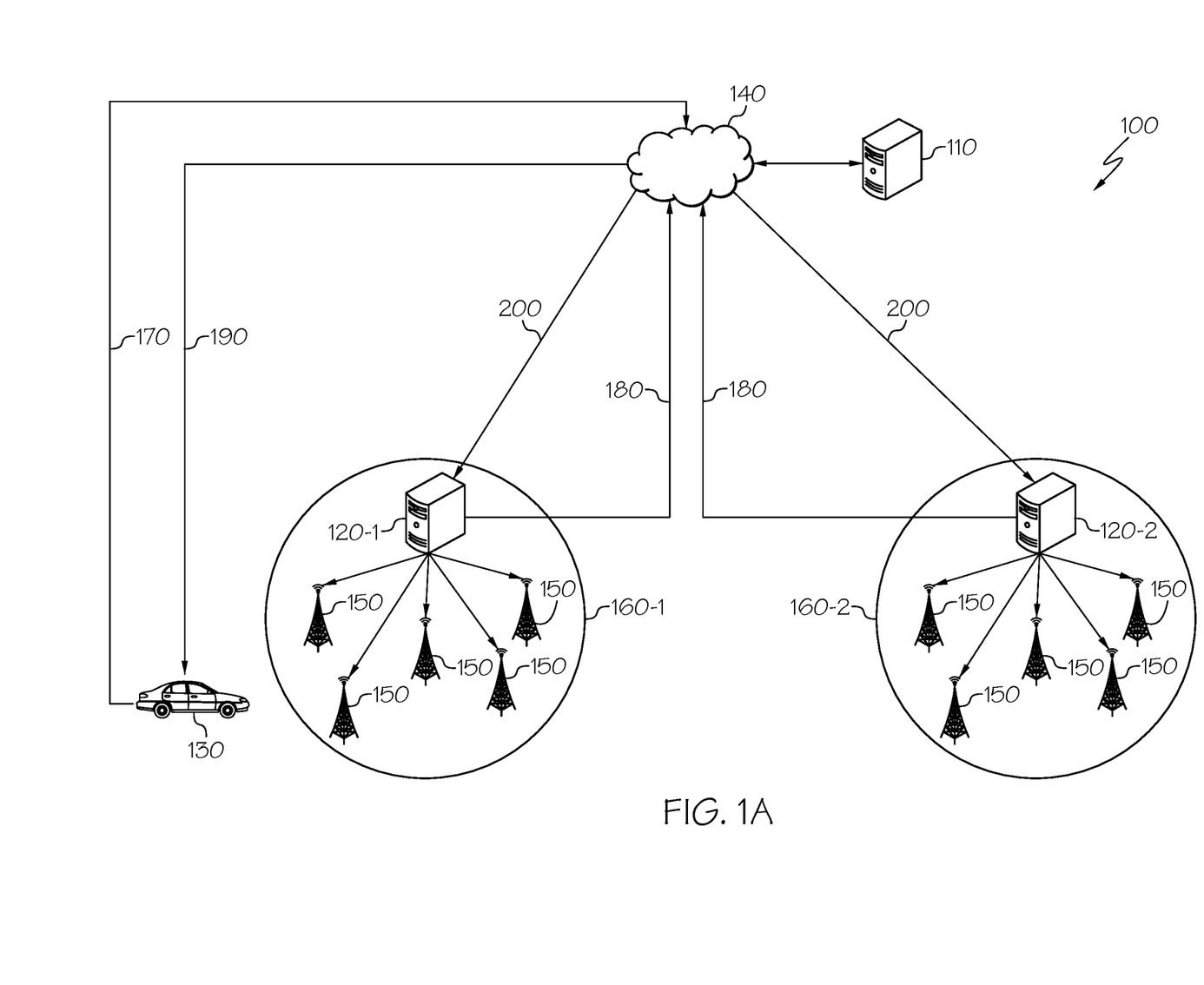
FIG. 1A schematically depicts a system for optimizing an HD map generation process of an edge server network according to one or more embodiments shown and described herein.
Figure 1B:
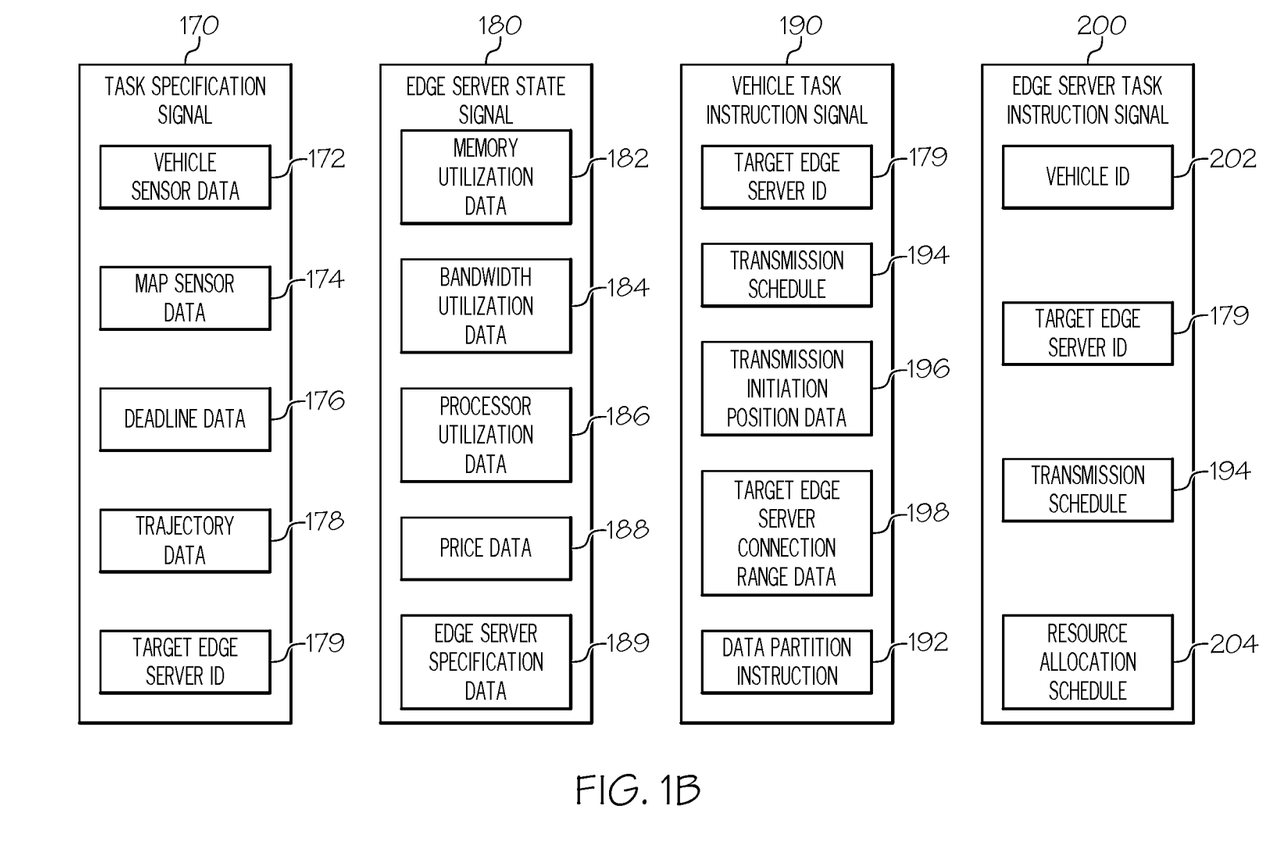
FIG. 1B schematically depicts various information communicated by at least one of the vehicle and one or more edge servers according to one or more embodiments shown and described herein.

Referring now to FIGS. 1A-1B, a system 100 for optimizing an HD map generation process of an edge server network according to one or more embodiments is shown and described herein. In some embodiments, the system 100 includes a service allocation computing device 110, edge server computing devices 120-1, 120-2 (collectively referred to as edge server computing devices 120), and a vehicle 130. The service allocation computing device 110 may be implemented in a cloud computing system and may manage the edge server computing devices 120. The edge server computing devices 120 are communicatively coupled to the service allocation computing device 110 via a network 140, which may be any suitable wireless communication network enabling communication between the service allocation computing device 110 and the edge server computing devices 120 (e.g., a wireless fidelity (Wi-Fi™) network, a cellular network, and/or the like).

Each of the edge server computing devices 120 communicates with one or more edge servers 150 located within a corresponding region 160-1, 160-2. As a non-limiting example, the edge server computing device 120-1 may communicate with and control one or more edge servers 150 located in region 160-1. As another non-limiting example, the edge server computing device 120-2 may communicate with and control one or more edge servers 150 located in region 160-2. As described below in further detail, each of the one or more edge servers 150 may generate at least a portion of the HD map based on a partition of data obtained by one or more sensors of the vehicle 130.

In some embodiments, the vehicle 130 may travel within or near one of the regions 160-1, 160-2 (collectively referred to as regions 160). While the illustrated embodiment depicts the vehicle 130 as being an automobile, it should be understood that the system 100 may include various types of mobile objects, such as a terrestrial vehicle, an aquatic vehicle, and/or an airborne vehicle. As a non-limiting example, the vehicle 130 may be an unmanned aerial vehicle (e.g., a drone). As another non-limiting example, the vehicle 130 may be an autonomous vehicle that navigates an environment with limited human input or without any human input.

In some embodiments, the vehicle 130 may transmit a task specification signal 170 to the service allocation computing device 110 via the network 140. As a non-limiting example and as illustrated in FIG. 1B, the task specification signal 170 includes vehicle sensor data 172, map sensor data 174, deadline data 176, trajectory data 178, and a target edge server ID 179. It should be understood that the task specification signal 170 may include other types of data in other embodiments.

By referring to FIG. 1B, the vehicle sensor data 172 includes any data indicating an operating characteristic of the vehicle 130. As a non-limiting example, the vehicle sensor data 172 includes location data obtained from a global navigation satellite system sensor of the vehicle 130 (e.g., a GPS sensor). As another non-limiting example, the vehicle sensor data 172 includes force data, angular rate data, and orientation data of the vehicle 130 obtained from an inertial measurement unit of the vehicle 130. As yet another non-limiting example, the vehicle sensor data 172 includes speed data of the vehicle 130, acceleration data of the vehicle 130, fuel level data of the vehicle 130, and/or the like. In some embodiments, the vehicle sensor data 172 may be utilized to determine a pose of the vehicle 130 (i.e., location and orientation of the vehicle 130), as described below in further detail with reference to FIG. 4. In some embodiments, the vehicle sensor data 172 may include information indicating a number of sensors used to obtain the operating characteristics of the vehicle 130, a type of sensor used to obtain the operating characteristics of the vehicle 130, and/or a size of the data obtained by the sensors used to obtain the operating characteristics of the vehicle 130. It should be understood that the vehicle sensor data 172 includes any type of data indicating an operating characteristic of the vehicle 130 and is not limited to the embodiments described herein.

The map sensor data 174 includes any data indicating features of a roadway system and/or environment surrounding the vehicle 130 including, but not limited to, traffic lights, traffic signs, curbs, crosswalks, railway tracks, guardrails, poles, bus stops, speed bumps, potholes, overpasses, buildings, and/or the like. It should be understood that the map sensor data 174 includes any type of data indicating features of a roadway system and/or environment surrounding the vehicle 130 and is not limited to the embodiments described herein. The vehicle 130 may include various types of sensors for obtaining the map sensor data 174 including, but not limited to, a LIDAR sensor, a radar sensor, an infrared sensor, a sonar sensor, an ultrasonic sensor, an optical sensor, a Doppler effect sensor, a camera, an imaging sensor, and/or the like. In some embodiments, the map sensor data 174 may include information indicating a number of sensors used to obtain the features of the roadway system and/or surrounding environment, a type of sensor used to obtain the features of the roadway system and/or surrounding environment, a size of the data obtained used to obtain the features of the roadway system and/or surrounding environment, and/or a list of semantics/attributes to be determined from the map sensor data 174 (e.g., lane recognition, traffic sign recognition, traffic light association, etc.). In some embodiments, the map sensor data 174 and the pose of the vehicle 130 may be utilized to generate the HD map, as described below in further detail with reference to FIG. 4.

The deadline data 176 includes information indicating a request for real-time data processing. In some embodiments, the deadline data 176 may be automatically generated by the vehicle 130 or may be manually generated by a user of the vehicle 130. As a non-limiting example, the deadline data 176 may be a binary value indicating a request for real-time data processing or a request for asynchronous data processing.

The trajectory data 178 includes information indicating a trajectory and/or route of the vehicle 130. In some embodiments, the trajectory data 178 may be obtained by a global navigation system sensor of the vehicle 130, a navigation system of the vehicle 130, and/or a mobile device executing a navigation application and in communication with the vehicle 130. As a non-limiting example, the trajectory data 178 includes information indicating particular roads of a roadway system in which the vehicle 130 is currently using and/or will use to arrive at a predetermined destination. As another non-limiting example, the trajectory data 178 includes information indicating particular regions 160 in which the vehicle 130 will travel within in order to arrive at the predetermined destination.

The target edge server ID 179 includes information identifying the one or more edge servers 150 that are within a communication range of the vehicle 130. In some embodiments, the target edge server ID 179 includes information identifying the one or more edge servers 150 that are located along the trajectory and/or route of the vehicle 130 as determined by the trajectory data 178.

In some embodiments, the edge server computing devices 120 may transmit an edge server state signal 180 associated with the one or more edge servers 150. As a non-limiting example and as illustrated in FIG. 1B, the edge server state signal 180 includes memory utilization data 182, bandwidth utilization data 184, processor utilization data 186, price data 188, and edge server specification data 189. It should be understood that the edge server state signal 180 may include other types of data in other embodiments.

The memory utilization data 182 includes information indicating an amount of available memory of the one or more edge servers 150 identified by the target edge server ID 179. The bandwidth utilization data 184 includes information indicating a memory bandwidth of the one or more edge servers 150 identified by the target edge server ID 179. The processor utilization data 186 includes information indicating an amount of available processing resources (e.g., one or more processors) of the one or more edge servers 150 identified by the target edge server ID 179.

The price data 188 includes information indicating a cost schedule associated with the one or more edge servers 150 identified by the target edge server ID 179. As a non-limiting example, the price data 188 may include information indicating sensor data uploading fees (e.g., 1 USD/Mb), HD map download fees (e.g., 0.5 USD/Mb), and data processing fees (e.g., 3 USD/Mb). It should be understood that the price data 188 may include other pricing information associated with any function described in the embodiments herein and/or any function utilized in the HD map generation process.

The edge server specification data 189 includes information indicating various computing capabilities of the one or more edge servers 150 identified by the target edge server ID 179, such as whether the one or more edge servers 150 can process the particular type and/or size of vehicle sensor data 172 and/or map sensor data 174.

Based on the task specification signal 170 and the edge server state signal 180, the service allocation computing device 110 generates a vehicle task instruction signal 190, as described below in further detail. As a non-limiting example and as illustrated in FIG. 1B, the vehicle task instruction signal 190 includes the target edge server ID 179, a data partition instruction 192, a transmission schedule 194, transmission initiation position data 196, and a target edge server connection range data 198. It should be understood that the vehicle task instruction signal 190 may include other types of data in other embodiments.

The data partition instruction 192 includes information indicating whether the vehicle sensor data 172 and/or the map sensor data 174 will be separated into a plurality of partitions prior to transmitting the vehicle sensor data 172 and the map sensor data 174 to the one or more edge servers 150 identified by the service allocation computing device 110. Identifying one or more edge servers 150 and separating the vehicle sensor data 172 and/or the map sensor data 174 into a plurality of partitions is described below in further detail with reference to FIGS. 3-4. Furthermore, the data partition instruction 192 includes information indicating a number of partitions of the vehicle sensor data 172 and the map sensor data 174 that the vehicle 130 will generate.

The transmission schedule 194 includes information indicating when the vehicle 130 will transmit the one or more partitions of the vehicle sensor data 172 and/or the map sensor data 174 to the one or more edge servers 150 identified by the service allocation computing device 110, as described below in further detail with reference to FIGS. 3 and 4. As a non-limiting example, the vehicle sensor data 172 and the map sensor data 174 may be separated into a plurality of partitions (e.g., the vehicle sensor data 172 and the map sensor data 174 are separated into five partitions), and the vehicle 130 may transmit a corresponding partition at a particular time to each of the one or more edge servers 150 (e.g., the one or more edge servers 150 comprises five edge servers, and each of the five edge servers receives one of the five partitions at a particular time).

The transmission initiation position data 196 includes information indicating a location in which the vehicle transmits the one or more partitions of the vehicle sensor data 172 and/or the map sensor data 174 to the one or more edge servers 150 identified by the service allocation computing device 110. As a non-limiting example, the vehicle sensor data 172 and the map sensor data 174 may be separated into a plurality of partitions (e.g., the vehicle sensor data 172 and the map sensor data 174 are partitioned into six partitions), and the vehicle 130 may transmit a corresponding partition to a particular edge server of the one or more edge servers 150 when the vehicle 130 is at a corresponding location (e.g., when the vehicle 130 arrives at a first location as indicated by a global navigation satellite system sensor of the vehicle 130, the vehicle 130 transmits a first partition of the vehicle sensor data 172 and the map sensor data 174 to a first edge server of the one or more edge servers 150, etc.).

The target edge server connection range data 198 includes information indicating a distance in which the vehicle 130 is able to communicate with the one or more edge servers 150. As a non-limiting example, the target edge server communication range data 198 may indicate a radius from the vehicle 130 in which the vehicle 130 is able to communicate with the one or more edge servers 150. In some embodiments, the target edge server communication range data 198 may be dynamically updated based on environmental conditions that may impact the distance in which the vehicle 130 is able to communicate with the one or more edge servers 150, such as weather, noise, etc.

Referring back to FIG. 1A, in some embodiments, the service allocation computing device 110 may also generate an edge server task instruction signal 200 based on the task specification signal 170 and the edge server state signal 180. As a non-limiting example and as illustrated in FIG. 1B, the edge server task instruction signal 200 includes the target edge server ID 179, the transmission schedule 194, a vehicle ID 202, and a resource allocation schedule 204. It should be understood that the edge server task instruction signal 200 may include other types of data in other embodiments.

The vehicle ID 202 includes identifying information of the vehicle 130. Accordingly, the vehicle ID 202 enables the one or more edge servers 150 to, for example, authenticate and verify (e.g., execute a cryptographic authentication and verification algorithm) that the information received is from the vehicle 130 and is not subjected to tampering or other sources of manipulation.

The resource allocation schedule 204 includes information indicating the necessary computing resources for processing the vehicle sensor data 172 and/or the map sensor data 174 (or partitions thereof) and generating the HD map. As a non-limiting example, the resource allocation schedule 204 may indicate the processing capacity, memory resources, and bandwidth needed to process the vehicle sensor data 172 and/or the map sensor data 174 and to generate the HD map.

As described below in further detail with reference to FIGS. 3-4, the vehicle 130 transmits the task specification signal 170 to the service allocation computing device 110, and the one or more edge servers 150 transmit the edge server state signal 180 to the service allocation computing device 110. Based on the task specification signal 170 and the edge server state signal 180, the service allocation computing device 110 identifies a set of the one or more edge servers 150 (e.g., one edge server, three edge servers, or any other number of edge servers) and transmits the vehicle task instruction signal 190 to the vehicle 130 and the edge server task instruction signal 200 to the identified set of one or more edge servers 150. The vehicle task instruction signal 190 may instruct the vehicle 130 to partition the vehicle sensor data 172 and/or the map sensor data 174 into a plurality of partitions and instruct the vehicle 130 to transmit the corresponding partition to a particular edge server of the set of the one or more edge servers 150 at a certain time and/or when the vehicle 130 is at a particular location. The edge server task instruction signal 200 may cause set of one or more edge servers 150 to process the corresponding partition and generate the HD map based on the corresponding partition when the corresponding partition is received by the set of one or more edge servers 150. Accordingly, the speed and efficiency in which the HD map generation process is executed may be improved, as described below in further detail.

Figure 2:
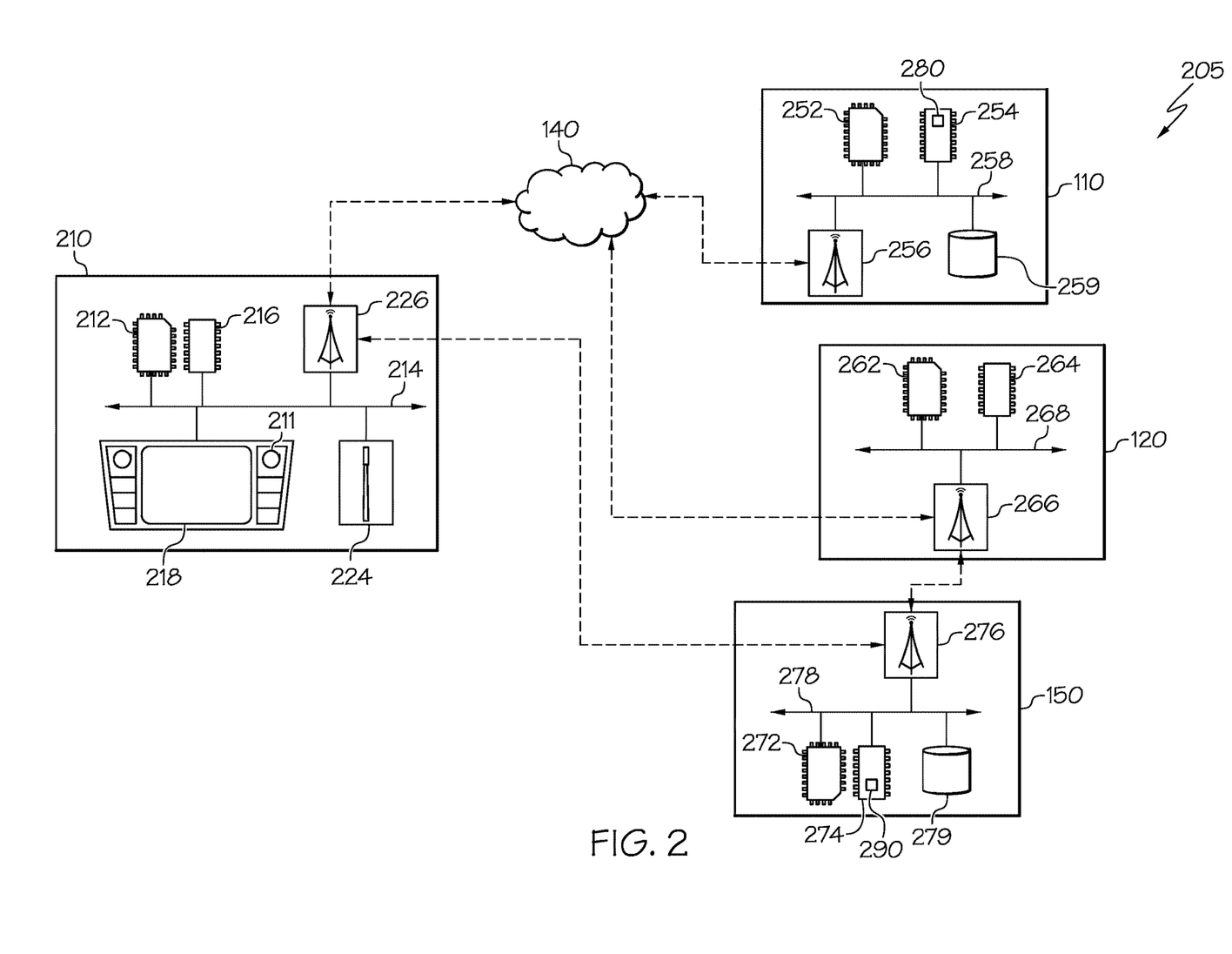
FIG. 2 schematically depicts a functional block diagram of a system for optimizing an HD map generation process according to one or more embodiments shown and described herein.

FIG. 2 depicts a functional block diagram of a system 205 for optimizing an HD map generation process. In some embodiments, the system 205 includes vehicle system 210, the service allocation computing device 110, the edge server computing device 120, and the one or more edge servers 150. While the vehicle system 210 is depicted in isolation, it should be understood that the vehicle system 210 may be included within the vehicle 130 in some embodiments. In some embodiments, the vehicle system 210 may include tactile input hardware 211, one or more processors 212, a communication interface 214, one or more memory modules 216, a display 218, a satellite antenna 224, and network interface hardware 226. It should be understood that the vehicle system 210 may include additional and/or alternative components in other embodiments.

In some embodiments, each of the one or more processors 212 may be any device capable of executing machine readable and executable instructions. Accordingly, each of the one or more processors 212 may be a controller, an integrated circuit, a microchip, a computer, or any other processing device. The one or more processors 212 are coupled to the communication interface 214 that provides signal interconnectivity between various modules of the vehicle system 210. Accordingly, the communication interface 214 may communicatively couple any number of processors 212 with one another, and allow the modules coupled to the communication interface 214 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication interface 214 may be formed from any medium that is capable of transmitting a signal such as, for example, conductive wires, conductive traces, optical waveguides, or the like. In some embodiments, the communication interface 214 may facilitate the transmission of wireless signals, such as WiFi, Bluetooth®, Near Field Communication (NFC) and the like. Moreover, the communication interface 214 may be formed from a combination of mediums capable of transmitting signals. In one embodiment, the communication interface 214 comprises a combination of conductive traces, conductive wires, connectors, and buses that cooperate to permit the transmission of electrical data signals to components such as processors, memories, sensors, input devices, output devices, and communication devices. Accordingly, the communication interface 214 may comprise a vehicle bus, such as a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 216 are coupled to the communication interface 214. The one or more memory modules 216 may comprise a non-transitory computer-readable medium, such as RAM, ROM, flash memories, hard drives, or any device capable of storing machine readable and executable instructions such that the machine readable and executable instructions can be accessed by the one or more processors 212. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 216. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

With continued reference to FIG. 2, the display 218 provides various visual outputs, such as, for example, maps, navigation, entertainment, seat arrangements or a combination thereof. The display 218 may output one of map, navigation, and entertainment. The display 218 is coupled to the communication interface 214. Accordingly, the communication interface 214 communicatively couples the display 218 to other modules of the vehicle system 210 including, without limitation, the one or more processors 212 and/or the one or more memory modules 216. In embodiments, the display 218 may be a touchscreen that, in addition to visually displaying information, detects the presence and location of a tactile input upon a surface of or adjacent to the display 218. For example, a driver or occupant of the vehicle may input a destination of the vehicle or a service request through the display 218. Accordingly, each display may receive mechanical (e.g., touch) input directly upon the optical output provided by the display 218.

The tactile input hardware 211 is coupled to the communication interface 214 such that the communication interface 214 communicatively couples the tactile input hardware 211 to other modules of the vehicle system 210. The tactile input hardware 211 may be any device capable of transforming mechanical, optical, or electrical signals into a data signal capable of being transmitted with the communication interface 214. Specifically, the tactile input hardware 211 may include any number of movable objects that transform physical motion into a data signal that can be transmitted over the communication interface 214 such as, for example, a button, a switch, a knob, a microphone or the like.

The satellite antenna 224 is coupled to the communication interface 214 such that the communication interface 214 communicatively couples the satellite antenna 224 to other modules of the vehicle system 210. The satellite antenna 224 is configured to receive signals from global positioning system satellites. Specifically, in one embodiment, the satellite antenna 224 includes one or more conductive elements that interact with electromagnetic signals transmitted by global navigation system satellites. The received signal is transformed into a data signal indicative of the location (e.g., latitude and longitude) of the satellite antenna 224 or an object positioned near the satellite antenna 224, by the one or more processors 212.

Still referring to FIG. 2, the vehicle system 210 may be communicatively coupled to the service allocation computing device 110 by the network 140. In one embodiment, the network 140 may include one or more computer networks (e.g., a personal area network, a local area network, or a wide area network), cellular networks, satellite networks and/or a global positioning system and combinations thereof. Accordingly, the vehicle system 210 can be communicatively coupled to the network 140 via a wide area network, a local area network, a personal area network, a cellular network, a satellite network, etc. Suitable local area networks may include wired Ethernet and/or wireless technologies such as, for example, wireless fidelity (Wi-Fi™). Suitable personal area networks may include wireless technologies such as, for example, IrDA, Bluetooth®, Wireless USB, Z-Wave™, which is a wireless communication protocol, ZigBee™ which is a IEEE 802.15.4-based specification for a suite of high-level communication protocols, and/or other near field communication protocols. Suitable cellular networks include, but are not limited to, technologies such as LTE, WiMAX™ (Worldwide Interoperability for Microwave Access), UMTS, CDMA, and GSM.

Still referring to FIG. 2, the network interface hardware 226 communicatively couples the vehicle system 210 to the service allocation computing device 110, the edge server computing device 120, and/or the one or more edge servers 150 via the network 140. The network interface hardware 226 can be communicatively coupled to the communication interface 214 and can be any device capable of transmitting and/or receiving data via the network 140. Accordingly, the network interface hardware 226 can include a communication transceiver for sending and/or receiving any wired or wireless communication. For example, the network interface hardware 226 may include an antenna, a modem, LAN port, Wi-Fi™ card, WiMAX™ card, mobile communications hardware, near-field communication hardware, satellite communication hardware and/or any wired or wireless hardware for communicating with other networks and/or devices. In one embodiment, the network interface hardware 226 includes hardware configured to operate in accordance with the Bluetooth® wireless communication protocol.

The service allocation computing device 110 includes one or more processors 252, one or more memory modules 254, network interface hardware 256, a communication path 258, and an optimization database 259. Similar to the one or more processors 212, the one or more processors 252 may be a controller, an integrated circuit, a microchip, a computer, or any other computing device. Similar to the one or more memory modules 216, the one or more memory modules 254 may comprise one or more non-transitory computer-readable mediums, such as RAM, ROM, flash memories, hard drives, or any device capable of storing machine readable and executable instructions such that the machine readable and executable instructions can be accessed and executed by the one or more processors 252. Furthermore, the one or more memory modules 254 may include an optimization module 280, which is described below in further detail with reference to FIGS. 3-4. In some embodiments, the network interface hardware 256 communicates with the edge server computing device 120, the one or more edge servers 150, and/or the vehicle 130.

The edge server computing device 120 includes one or more processors 262, one or more memory modules 264, network interface hardware 266, and a communication path 268. Similar to the one or more processors 212, the one or more processors 262 may be a controller, an integrated circuit, a microchip, a computer, or any other computing device. Similar to the one or more memory modules 216, the one or more memory modules 264 may comprise one or more non-transitory computer-readable mediums, such as RAM, ROM, flash memories, hard drives, or any device capable of storing machine readable and executable instructions such that the machine readable and executable instructions can be accessed and executed by the one or more processors 262. In some embodiments, the network interface hardware 266 communicates with the edge server computing device 120, the one or more edge servers 150, and/or the vehicle 130.

The one or more edge servers 150 include one or more processors 272, one or more memory modules 274, network interface hardware 276, a communication path 278, and an HD map generation database 279. Similar to the one or more processors 212, the one or more processors 272 may be a controller, an integrated circuit, a microchip, a computer, or any other computing device. Similar to the one or more memory modules 216, the one or more memory modules 274 may comprise one or more non-transitory computer-readable mediums, such as RAM, ROM, flash memories, hard drives, or any device capable of storing machine readable and executable instructions such that the machine readable and executable instructions can be accessed and executed by the one or more processors 272. Furthermore, the one or more memory modules 274 may include an HD map generation module 290, which is described below in further detail with reference to FIGS. 3-4. In some embodiments, the network interface hardware 276 communicates with the service allocation computing device 110, the edge server computing device 120, and/or the vehicle 130.

A description of the optimization module 280 and the HD map generation module 290 will now be provided. The optimization module 280 is configured to generate the vehicle task instruction signal 190 and the edge server task instruction signal 200 based on the task specification signal 170 and the edge server state signal 180. Furthermore, the optimization module 280 may identify one or more optimization algorithms stored in the optimization database 259 in order to generate the vehicle task instruction signal 190 and the edge server task instruction signal 200. The functionality of the optimization module 280 is described below in further detail with reference to FIG. 4.

The HD map generation module 290 is configured to generate at least a portion of the HD map based on the edge server task instruction signal 200 received by the corresponding one or more edge servers 150. Furthermore, the HD map generation module 290 may reference the HD map generation database 279 in order to generate the corresponding portion of the HD map based on the edge server state signal 180. The functionality of the HD map generation module 290 is described below in further detail with reference to FIGS. 3-4.

Figure 3:
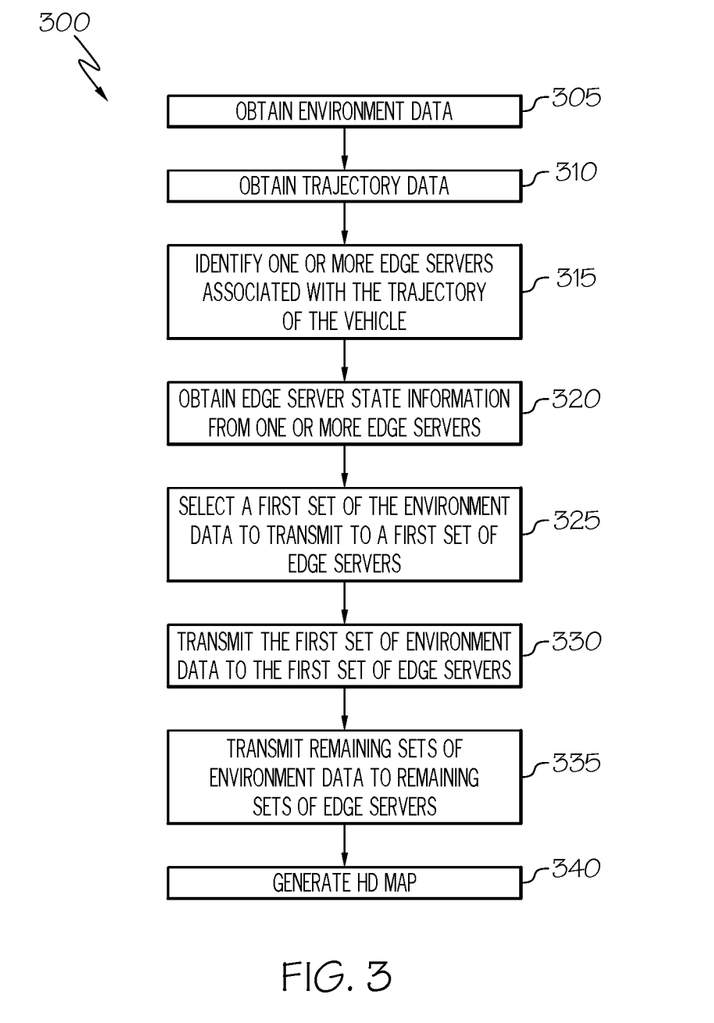
FIG. 3 depicts a flow diagram for optimizing an HD map generation process according to one or more embodiments shown and described herein.

With reference to FIG. 3, a flow diagram illustrating an example HD map generation optimization method is schematically depicted. The flow diagram elements described herein may be translated into machine-readable instructions. While the steps shown in FIG. 3 are shown as all occurring and in a particular order, in other embodiments one or more of the steps may not be performed, and in some embodiments, one or more of the steps may be performed in a different order as shown and described herein.

Referring to FIG. 3 in conjunction with FIGS. 1A, 1B, and 2, at step 305, the vehicle 130 obtains environment data, which may include the map sensor data 174. As described above, the map sensor data 174 may include any data indicating features of a roadway system and/or other features of the surrounding environment including, but not limited to, traffic lights, traffic signs, curbs, crosswalks, railway tracks, guardrails, poles, bus stops, speed bumps, potholes, overpasses, and/or the like.

At step 310, the vehicle 130 obtains the trajectory data 178. As described above, the trajectory data 178 includes information indicating a trajectory and/or route of the vehicle 130. As a non-limiting example, the trajectory data 178 includes information indicating particular roads of a roadway system in which the vehicle 130 is currently using and will use to arrive at a predetermined destination.

At step 315, the service allocation computing device 110 identifies the one or more edge servers 150 associated with the trajectory of the vehicle 130. In some embodiments, the service allocation computing device 110 may receive the trajectory data 178 from the vehicle 130 and, based on the received trajectory data 178, may identify the one or more edge servers 150 that are located near the roads of the roadway system in which the vehicle 130 is currently using and/or will use to arrive at the predetermined destination.

At step 320, the service allocation computing device 110 obtains the edge server state signal 180 from the one or more edge servers 150 identified by the service allocation computing device 110. As described above, the edge server state signal 180 includes the memory utilization data 182, the bandwidth utilization data 184, the processor utilization data 186, the price data 188, and the edge server specification data 189 for each server of the one or more edge servers 150 identified by the service allocation computing device 110.

At step 325, the service allocation computing device 110 selects a first set of the identified one or more edge servers 150. The service allocation computing device 110 may select the first set of the identified one or more edge servers 150 based on the respective edge server state signal 180 of the identified one or more edge servers 150. As a non-limiting example, the service allocation computing device 110 may select the first set such that each edge server 150 of the first set has sufficient computing capacity (i.e., sufficient available memory as indicated by the memory utilization data 182, sufficient memory bandwidth as indicated by the bandwidth utilization data 184, and sufficient processing resources as indicated by the processor utilization data 186) for processing the vehicle sensor data 172 and the map sensor data 174 and for executing the HD map generation module 290. As another non-limiting example, the service allocation computing device 110 may select the first set such that each edge server 150 of the first set is below a certain price threshold as indicated by the price data 188.

Furthermore, at step 325, the service allocation computing device 110 selects a first set of the environment data to transmit to the first set of the identified one or more edge servers 150 in order to reduce a latency and cost of generating the HD map. In some embodiments, the service allocation computing device 110 may select the first set of data based on the size and/or type of vehicle sensor data 172 and the map sensor data 174 and based on the computing capacity of each edge server of the first set of the identified one or more edge servers 150.

At step 330, the vehicle 130 transmits the first set of the environment data to the first set of the identified one or more edge servers 150. As described above, the vehicle 130 may receive the vehicle task instruction signal 190 and transmit the first set of the environment data to the first set of the identified one or more edge servers 150 in accordance with the vehicle task instruction signal 190, as described below in further detail with reference to FIG. 4. At step 335, the vehicle 130 transmits the remaining sets of the environment data to the remaining sets of the identified one or more edge servers 150. At step 340, each set of the one or more identified edge servers 150 generates the HD map based on the respective sets of environment data, which is described below in further detail with reference to FIG. 4.

Figure 4:
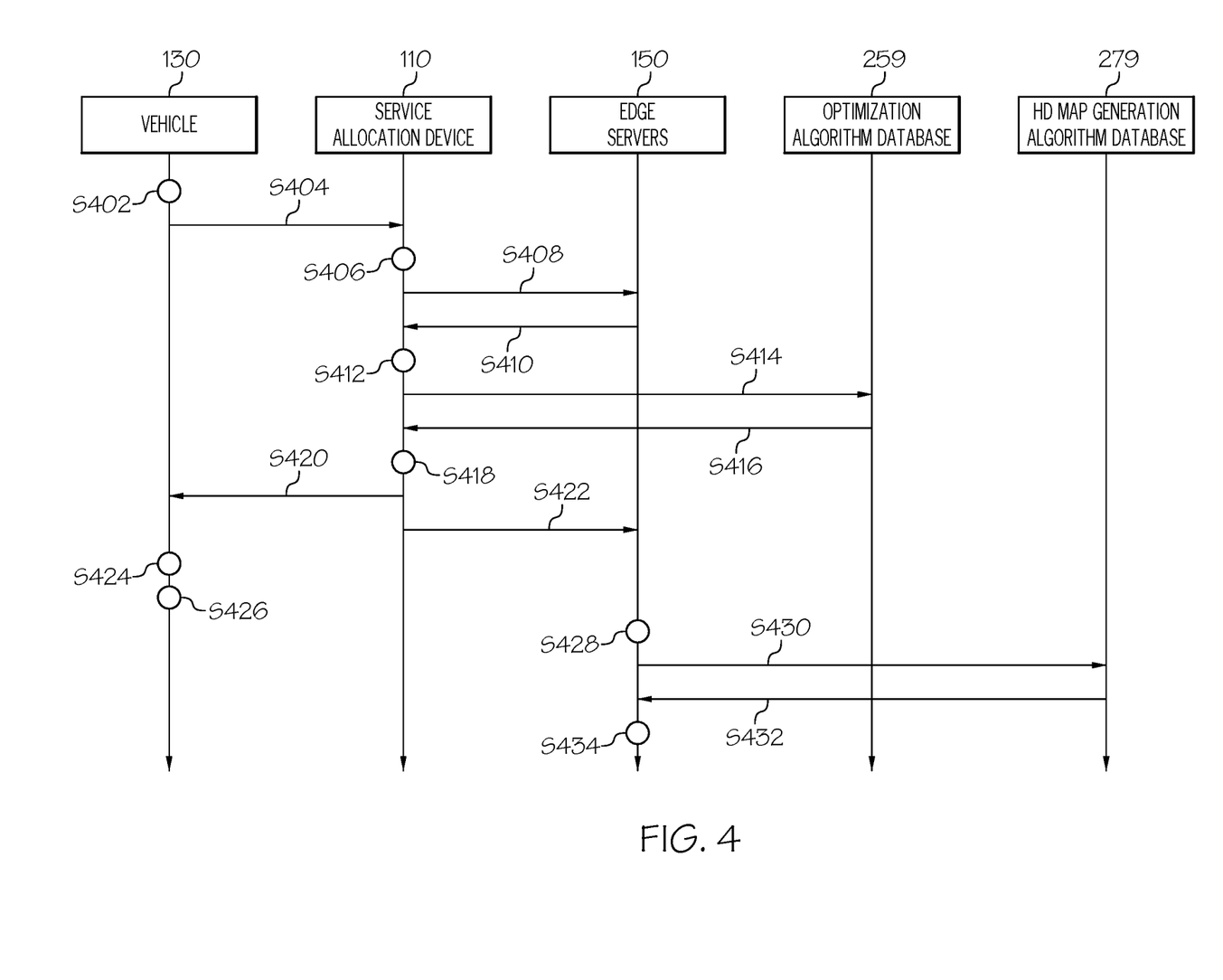
FIG. 4 depicts a sequence diagram of optimizing an HD map generation process according to one or more embodiments shown and described herein.

Referring now to FIG. 4, a sequence diagram illustrating an example HD map generation optimization method is schematically depicted. The sequence diagram elements described herein may be translated into machine-readable instructions. While the steps shown in FIG. 4 are shown as all-occurring and in a particular order, in other embodiments one or more of the steps may not be performed, and in some embodiments, one or more of the steps may be performed in a different order as shown and described herein.

Referring to FIG. 4 in conjunction with FIGS. 1A, 1B, and 2, at step 402, the vehicle 130 generates the vehicle sensor data 172 and the map sensor data 174 using one or more sensors of the vehicle 130. At step 404, the vehicle 130 transmits the task specification signal 170 to the service allocation computing device 110 via the network 140.

At step 406, the service allocation computing device 110 identifies the one or more edge servers 150 associated with the trajectory of the vehicle 130. Furthermore, the service allocation computing device 110 determines a resolution of the HD map based on the deadline data 176 of the task specification signal 170. As a non-limiting example, if the deadline data 176 indicates a real-time request for execution of the HD map generation module 290, the service allocation computing device 110 may determine that the resulting HD map will have a low resolution. As another non-limiting example, if the deadline data 176 does not indicate a real-time request for execution of the HD map generation module 290, the service allocation computing device 110 may determine that the resulting HD map will have a higher resolution.

At step 408, the service allocation computing device 110 requests the identified one or more edge servers 150 to transmit the edge server state signal 180, and the identified one or more edge servers 150 transmit the edge server state signals 180 at step 410. At step 412, the optimization module 250 of the service allocation computing device 110 selects an optimization algorithm from the optimization database 259 in order to generate the vehicle task instruction signal 190 and the edge server task instruction signal 200. As a non-limiting example, the optimization module 250 may select an optimization algorithm that causes the service allocation computing device 110 to generate a vehicle task instruction signal 190 that instructs the vehicle 130 to partition the vehicle sensor data 172 and/or the map sensor data 174 into a plurality of partitions based on the edge server state signal 180, the resolution of the HD map, and the size/type of the vehicle sensor data 172 and the map sensor data 174. Furthermore, the optimization module 250 may select an optimization algorithm that causes the service allocation computing device 110 to generate an edge server task instruction signal 200 that causes a set of the one or more edge servers 150 to process the corresponding partition and generate the HD map based on the corresponding partition when the corresponding partition is received by the set of one or more edge servers 150. At step 414, the optimization module 250 of the service allocation computing device 110 requests the selected optimization instruction from the optimization database 259 and retrieves the selected optimization instruction at step 416.

At step 418, the optimization module 250 of the service allocation computing device 110 executes the retrieved optimization instruction and generates the vehicle task instruction signal 190 and the edge server task instruction signal 200. Furthermore, executing the retrieved optimization instruction may cause the service allocation computing device 110 to select a set of the identified one or more edge servers 150 to receive and process the corresponding partitions of the vehicle sensor data 172 and/or the map sensor data 174. At step 420, the service allocation computing device 110 transmits the vehicle task instruction signal 190 to the vehicle 130. At step 422, the service allocation computing device 110 transmits the edge server task instruction signal 200 to the set of the identified one or more edge servers 150.

At step 428, in response to receiving the edge server task instruction signal 200, each server of the set of the identified one or more edge servers 150 updates its corresponding memory utilization data 182, bandwidth utilization data 184, and processor utilization data 186. At step 430, each server of the set of the identified one or more edge servers 150 requests at least a portion of the HD map generation module 290 from the HD map generation database 279 and retrieves the corresponding portion of the HD map generation module 290 at step 432.

At step 424, in response to receiving the vehicle task instruction signal 190, the vehicle 130 partitions the vehicle sensor data 172 and the map sensor data 174 based on the data partition instruction 192 of the vehicle task instruction signal 190. At step 426, the vehicle 130 transmits the corresponding partitions of the vehicle sensor data 172 and the map sensor data 174 based on the target edge server ID 179, the transmission schedule 194, and/or the transmission initiation position data 196.

In response to receiving the corresponding partitions from the vehicle 130, each server of the set of the identified one or more edge servers 150 generates a corresponding portion of the HD map at step 434. To generate the HD map, the set of the identified one or more edge servers 150 may identify three-dimensional (3D) objects (e.g., traffic lights, traffic signs, curbs, crosswalks, etc.) and a corresponding location within the environment. Subsequently, the set of the identified one or more edge servers 150 may extract semantics and attributes based on the map sensor data 174 and the vehicle sensor data 172. As non-limiting examples, the set of the identified one or more edge servers 150 may execute a lane/road model construction algorithm, a traffic sign recognition algorithm, a traffic sign and lane association algorithm, a road marking semantic extraction algorithm, road element detection, and/or the like. Each portion of the HD map generated by the set of the identified one or more edge servers 150 may then be combined to generate the HD map, as shown below in FIG. 5B.

Figure 5A:
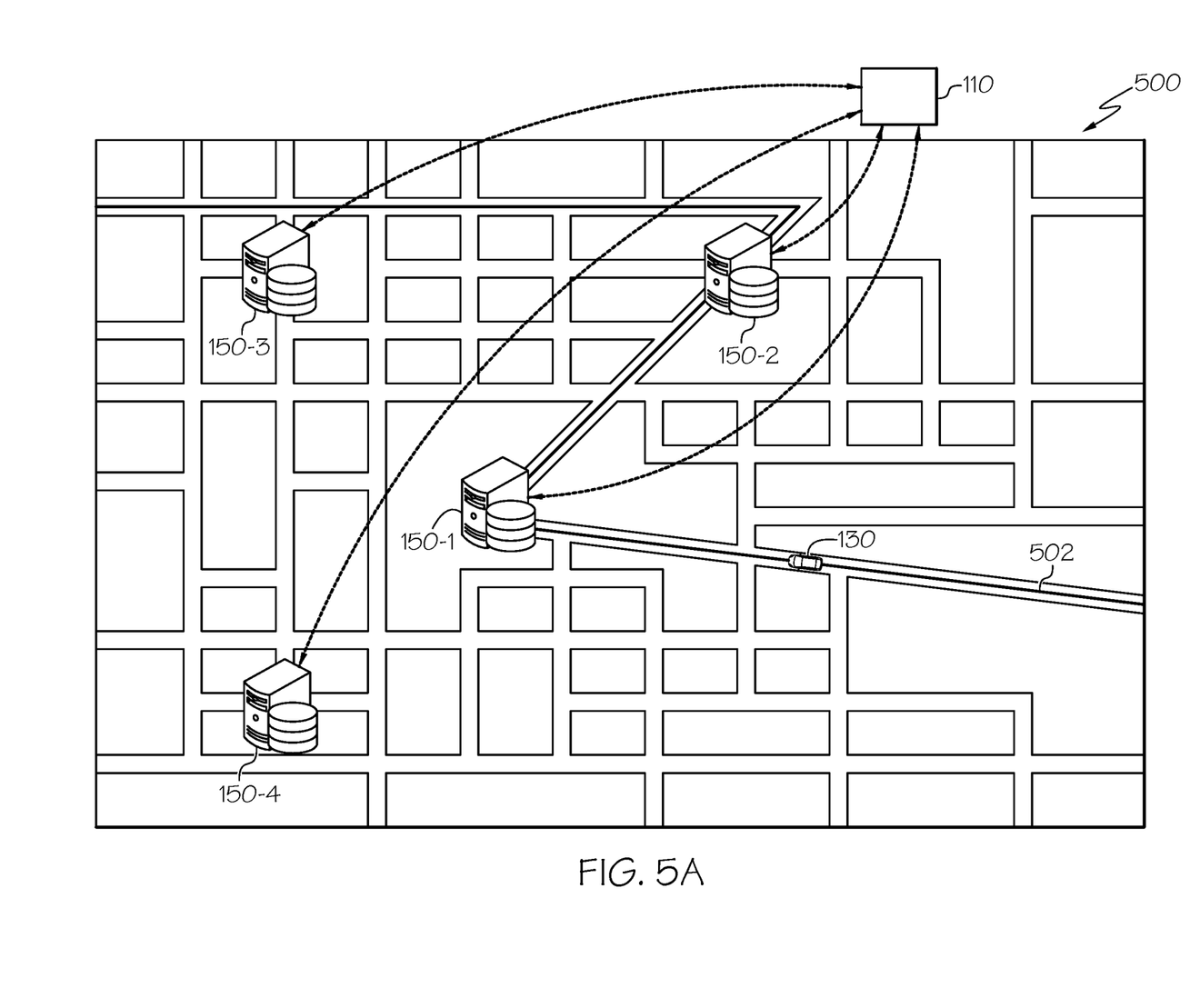
FIG. 5A schematically depicts a vehicle and an edge server network of a roadway system according to one or more embodiments shown and described herein.
Figure 5B:
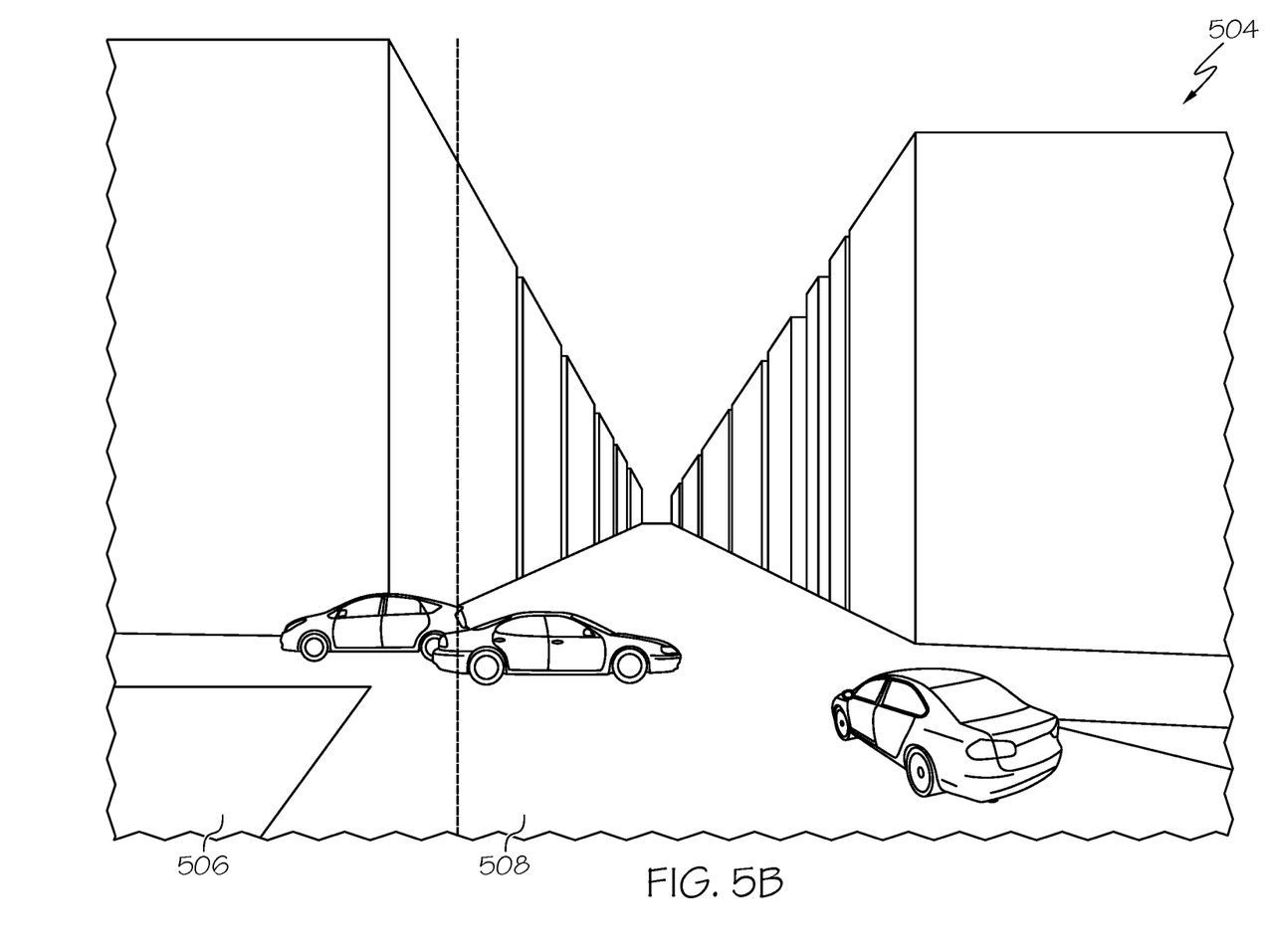
FIG. 5B schematically depicts partitioning sensor data obtained by a vehicle based on the optimized HD map generation process according to one or more embodiments shown and described herein.

With reference to FIGS. 5A-5B, an example roadway system 500 including the vehicle 130 is depicted. In some embodiments, the trajectory data 178 may indicate that the vehicle is traveling along road 502 of the roadway system 500. Moreover, a first edge server 150-1, a second edge server 150-2, a third edge server 150-3, and a fourth edge server 150-4 may be positioned along the road 502. As a non-limiting example, the service allocation computing device 110 may transmit the vehicle task instruction signal 190 to the vehicle 130 based on the task specification signal 170 and the edge server state signals 180. The vehicle task instruction signal 190 may then cause the vehicle 130 to generate two partitions of the vehicle sensor data 172 and the map sensor data 174, and the vehicle task instruction signal 190 may cause the vehicle 130 to transmit the first partition to the first edge server 150-1 and the second partition to the third edge server 150-3.

In response to receiving the corresponding partitions, the first edge server 150-1 and the third edge server 150-3 may generate the corresponding portion of the HD map as described above, and the corresponding portions of the HD map may be combined into the HD map 504. As a non-limiting example and as shown in FIG. 5B, the first edge server 150-1 may generate a first portion 506 of the HD map 504 corresponding to the first partition of the vehicle sensor data 172 and the map sensor data 174, and the third edge server 150-3 may generate the second portion 508 of the HD map 504 corresponding to the second partition of the vehicle sensor data 172 and the map sensor data 174. Subsequently, the service allocation computing device 110 may be combined into the HD map 504. By partitioning the vehicle sensor data 172 and the map sensor data 174 and selectively identifying one or more edge servers 150 for processing the partitions and generating the corresponding portions of the HD map, the speed and efficiency of generating the HD map 504 increases. Furthermore, partitioning the vehicle sensor data 172 and the map sensor data 174 and selectively identifying one or more edge servers 150 for processing the partitions and generating the corresponding portions of the HD map 504 also reduces the cost of generating the HD map 504.

It should now be understood that embodiments of the present disclosure are directed to systems for optimizing an HD map generation process using an edge server network. As described above, the HD map generation process may be optimized based on sensor data obtained by a vehicle, a computing capacity of one or more edge servers of an edge server network, and a computing resource price associated with the one or more edge servers of an edge server network. Accordingly, the one or more edge servers may generate the HD map with minimized latency.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A vehicle configured to
obtain environment data;
transmit trajectory data associated with the vehicle to a service allocation device;
receive, from the service allocation device, an instruction signal that instructs the vehicle to partition the environment data into a plurality of data partitions including a first data partition and a second data partition, the plurality of data partitions being determined based on a computing capacity of each of edge servers; and
in response to receiving the instruction signal, partition the environmental data into the plurality of data partitions and transmit the plurality of data partitions at a particular time to each of the edge servers.

2. The vehicle of claim 1, wherein the plurality of data partitions are configured to cause the edge servers to generate a map.

3. The vehicle of claim 1, wherein the computing capacity indicates at least one of: a memory utilization of each of the one or more edge servers, a bandwidth utilization of each of the edge servers, and a processor utilization of the each of the edge servers.

4. The vehicle of claim 1, further configured to:
obtain deadline data associated with the vehicle;
select a first edge server of the edge servers further based on the deadline data;
select a first optimization instruction from a plurality of optimization instructions based on the deadline data and the trajectory data; and
execute the first optimization instruction to select the first data partition of the environment data to transmit to the first edge server of the one or more edge servers.

5. The vehicle of claim 1, wherein:
the instruction signal indicates a transmission schedule corresponding to the first data partition of the plurality of data partitions; and
the instruction signal is configured to cause the vehicle to transmit the first data partition to a first edge server of the edge servers based on the transmission schedule.

6. A method comprising:
obtaining, by one or more processors, environment data and trajectory data associated with a vehicle;
identifying, by the one or more processors, edge servers associated with the trajectory data;
obtaining, by the one or more processors, edge server state information of the edge servers, wherein the edge server state information includes information indicating a computing capacity of each of the edge servers;
generating, by the one or more processors, an instruction signal that instructs the vehicle to partition the environment data into a plurality of data partitions including a first data partition and a second data partition, the plurality of data partitions being determined based on the computing capacity of each of the edge servers, and instructs the vehicle to transmit the first data partition to a first edge server of the edge servers; and
transmitting, by the one or more processors, the instruction signal to the vehicle; and
in response to receiving the instruction signal, partitioning, by the vehicle, the environmental data into the plurality of data partitions and transmitting the plurality of data partitions at a particular time to each of the edge servers.

7. The method of claim 6, further comprising:
generating another instruction signal that cause the vehicle to transmit the second data partition of the environment data to a second edge server of the edge servers.

8. The method of claim 7, wherein the first data partition of the environment data and the second data partition of the environment data are configured to cause the first edge server of the edge servers and the second edge server of the edge servers to generate a map.

9. The method of claim 6, wherein the computing capacity indicates at least one of: a memory utilization of the first edge server of the edge servers, a bandwidth utilization of the first edge server of the edge servers, and a processor utilization of the first edge server of the edge servers.

10. The method of claim 6, further comprising:
obtaining, by the one or more processors, deadline data associated with the vehicle;
selecting, by the one or more processors, the first edge server of the edge servers based on the deadline data;
selecting, by the one or more processors, a first optimization instruction from a plurality of optimization instructions based on the deadline data and the trajectory data; and
executing, by the one or more processors, the first optimization instruction to select the first data partition of the environment data to transmit to the first edge server of the edge servers.

11. The method of claim 6, wherein:
the instruction signal indicates a transmission schedule corresponding to the first data partition; and
the instruction signal is configured to cause the vehicle to transmit the first data partition to the first edge server of the edge servers based on the transmission schedule.

12. A system comprising:
a vehicle; and
a service allocation computing device configured to:
obtain environment data and trajectory data associated with the vehicle;
identify a plurality of edge servers associated with the trajectory data;
obtain edge server state information of the edge servers, wherein the edge server state information includes information indicating a computing capacity of the edge servers;

generate an instruction signal that instructs the vehicle to partition the environment data into a plurality of data partitions including a first data partition and a second data partition, the plurality of data partitions being determined based on the computing capacity of the edge servers; and transmit the instruction signal to the vehicle, wherein in response to receiving the instruction signal, the vehicle partitions the environmental data into the plurality of data partitions and transmits the plurality of data partitions at a particular time to each of the edge servers.

13. The system of claim 12, wherein the service allocation computing device is further configured to:

generate another instruction signal causing the vehicle to transmit the second data partition of the environment data to a second edge server of the edge servers.

14. The system of claim 13, wherein the first data partition of the environment data and the second data partition of the environment data are configured to cause the first edge server of the edge servers and the second edge server of the edge servers to generate a map.

15. The system of claim 12, wherein the computing capacity indicates at least one of: a memory utilization of the first edge server of the edge servers, a bandwidth utilization of the first edge server of the edge servers, and a processor utilization of the first edge server of the edge servers.

16. The system of claim 12, wherein the service allocation computing device is further configured to:

obtain deadline data associated with the vehicle;

select the first edge server of the edge servers based on the deadline data;

select a first optimization instruction from a plurality of optimization instructions based on the deadline data and the trajectory data; and execute the first optimization instruction, wherein executing the first optimization instruction causes the one or more processors to select the first data partition of the environment data to transmit to the first edge server of the edge servers.

\* \* \* \* \*